(12) United States Patent
Kuroki et al.

(10) Patent No.: US 6,683,746 B1
(45) Date of Patent: Jan. 27, 2004

(54) DISK DRIVE BREATHER FILTER WITH ADSORBENT LAYER SHORTER THAN RECEIVING SHEET APERTURE

(75) Inventors: Kenji Kuroki, Fujisawa (JP); Hiroaki Andoh, Fujisawa (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 0 days.

(21) Appl. No.: 09/501,482

(22) Filed: Feb. 9, 2000

(30) Foreign Application Priority Data

Feb. 10, 1999 (JP) ............................................. 11-033128

(51) Int. Cl.[7] ................................................. G11B 33/14
(52) U.S. Cl. .................................................. 360/97.02
(58) Field of Search ........................... 360/97.02, 97.03, 360/97.04; 55/320; 96/4, 17, 135

(56) References Cited

U.S. PATENT DOCUMENTS 5,417,743 A * 5/1995 Dauber .................... 360/97.02
5,997,614 A * 12/1999 Tuma et al. ............. 360/97.02

FOREIGN PATENT DOCUMENTS

JP          9-508061        8/1997

* cited by examiner

*Primary Examiner*—Craig A. Renner
(74) *Attorney, Agent, or Firm*—Robert B. Martin; Bracewell & Patterson, L.L.P.

(57) ABSTRACT

A breather filter for a hard disk drive is attached to a hole provided in the cover of the disk drive. The breather filter has a first sheet that forms a diffusing tube at a position corresponding to the hole provided in the cover of the disk drive. The filter also has a second sheet forming an opening at a position corresponding to the diffusing tube of the first sheet. A third sheet of the filter has an adsorbent layer at a position corresponding to the opening in the second sheet. Finally, a fourth sheet, including a filter layer, covers the adsorbent layer of the third sheet and is stacked with each of the sheets.

7 Claims, 3 Drawing Sheets

DISK DRIVE BREATHER FILTER WITH ADSORBENT LAYER SHORTER THAN RECEIVING SHEET APERTURE

BACKGROUND OF THE INVENTION

1. Technical Field

This invention relates in general to an improved data access and storage device and in particular to an improved filtration system for data access and storage devices. Still more particularly, the invention relates to an improved breather filter for low profile hard disk drives.

2. Description of the Prior Art

The breather filter in a hard disk drive (HDD) equalizes the pressure inside the HDD with the pressure outside the HDD while preventing particle contamination from entering the HDD. To date, prior art breather filters have been relatively simple structures. A particle filter is typically attached to a hole in the cover of the HDD with double-sided adhesive tape. However, due to higher recording density requirements for HDDs, there have been increased demands on breather filters to better protect corrosion-sensitive components. Such components include disks with a Co-system magnetic film and MR or GMR heads formed from Ni, Fe, Co, and Mn. In order to protect these components, breather filters must do more than filter dust from the ambient air that enters the HDD. For example, breather filters also must control air inflow, purify the air of organic or acid gases, reduce the relative humidity of the air, and perform highly efficient absorption of organic out gas within the HDD.

In the prior art, these additional demands are capable of being met by providing an adsorbent material (such as active carbon or a carbonate) for the purification of the outside air (organic gas and acid gas), a diffusing tube for restricting air inflow and controlling humidity, and an additional adsorbent material (active carbon), different from the first, for efficient absorption of organic out gas in the HDD.

Two configurations of conventional breather filters for HDDs are shown in FIGS. 5 and 6. Each filter has a top cover 51 has a hole 52, a plastic filter main body 53 with an internal diffusing tube 54, and a recess 55. An adsorbent material 56, such as active carbon, is located in recess 55. Each filter also has a plastic flow barrier 57 for dispersing gas being passed through the adsorbent material 56, a particle filter 58, such as a HEPA® filter, and an adhesive agent 59. In either example, the purification of the outside air by the adsorbent material 56, the inflow restriction on the outside air, and the reduction in the humidity change by the diffusing tube 54 can be effectively attained.

The difference between the two configurations of FIGS. 5 and 6, is that in FIG. 5 the area of contacted between the adsorbent material 56 and the HDD interior is small because there is the flow barrier 57. Therefore, the organic out gas in the HDD interior cannot be absorbed in a highly efficient manner. However, in FIG. 6, the organic out gas in the HDD interior can be absorbed at high efficiency by providing a different adsorbent material 56 than the one employed in the purification of the outside air. The additional adsorbent material 56 would be placed on the exterior of the flow barrier 57.

Thus, it is possible to achieve the previously defined additional demands with the conventional breather filters of FIGS. 5 and 6. However, the number and thickness of the components must increased to accommodate these requirements. Therefore, the original overall thickness of the breather filter, which was relatively thin because it was structurally simple, can no longer be maintained. In particular, it is difficult to design a low profile HDD (having a thickness of approximately one inch) with a high efficiency breather filter which is capable of achieving the additional requirements. Thus, an improved, low profile breather filter for HDDs is needed.

SUMMARY OF THE INVENTION

The present invention relates to a breather filter that is employed in a hard disk drive (HDD) by attaching it to a hole provided in the cover of the HDD. The breather filter is configured by preparing a first sheet forming a diffusing tube at a position corresponding to the hole provided in the cover of the HDD, a second sheet forming an opening at a position corresponding to the diffusing tube of the first sheet, a third sheet having an adsorbent layer at a position corresponding to the opening in the second sheet, a fourth sheet comprising a filter layer covering the adsorbent layer of the third sheet.

The breather filter is assembled by stacking the four sheets. This configuration forms a thin breather filter that can be mounted on a low profile HDD having a thickness of approximately one inch. The breather filter performs the same functions as conventional breather filters, such as air purification, inflow restriction, reduction in humidity change, and highly efficient absorption of organic out gas in the HDD interior, by forming the diffusing tube and the adsorbent layer in the respective sheets.

The four sheets are preferably retained with adhesive. For example, the first and third sheets may be assembled with double-sided adhesive tape. In addition, an adsorbent layer provided in the third sheet is equipped with an active carbon fiber containing a carbonate. Moreover, the adsorbent layer in the third sheet is capable of covering a portion or all of the opening formed in the second sheet. Accordingly, it is an object of the present invention to provide an improved data access and storage device.

It is an additional object of the present invention to provide an improved filtration system for data access and storage devices.

Still another object of the present invention is to provide an improved breather filter for low profile hard disk drives.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
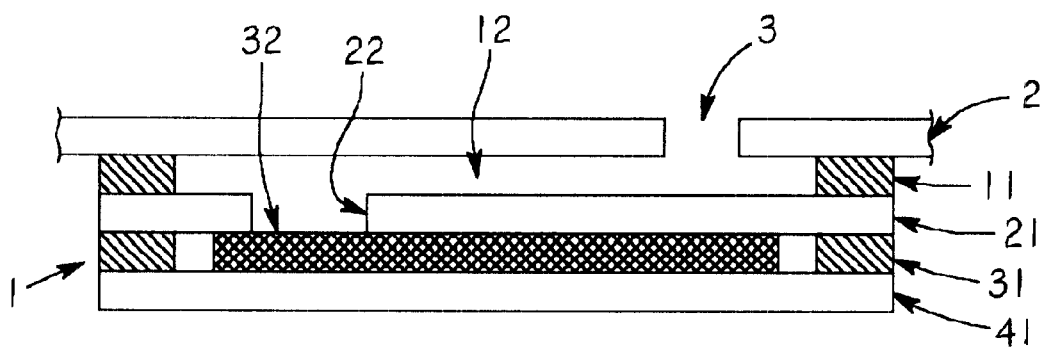
FIG. 1 is a sectional side view of a first embodiment of a breather filter for an HDD constructed in accordance with the invention.
Figure 2:
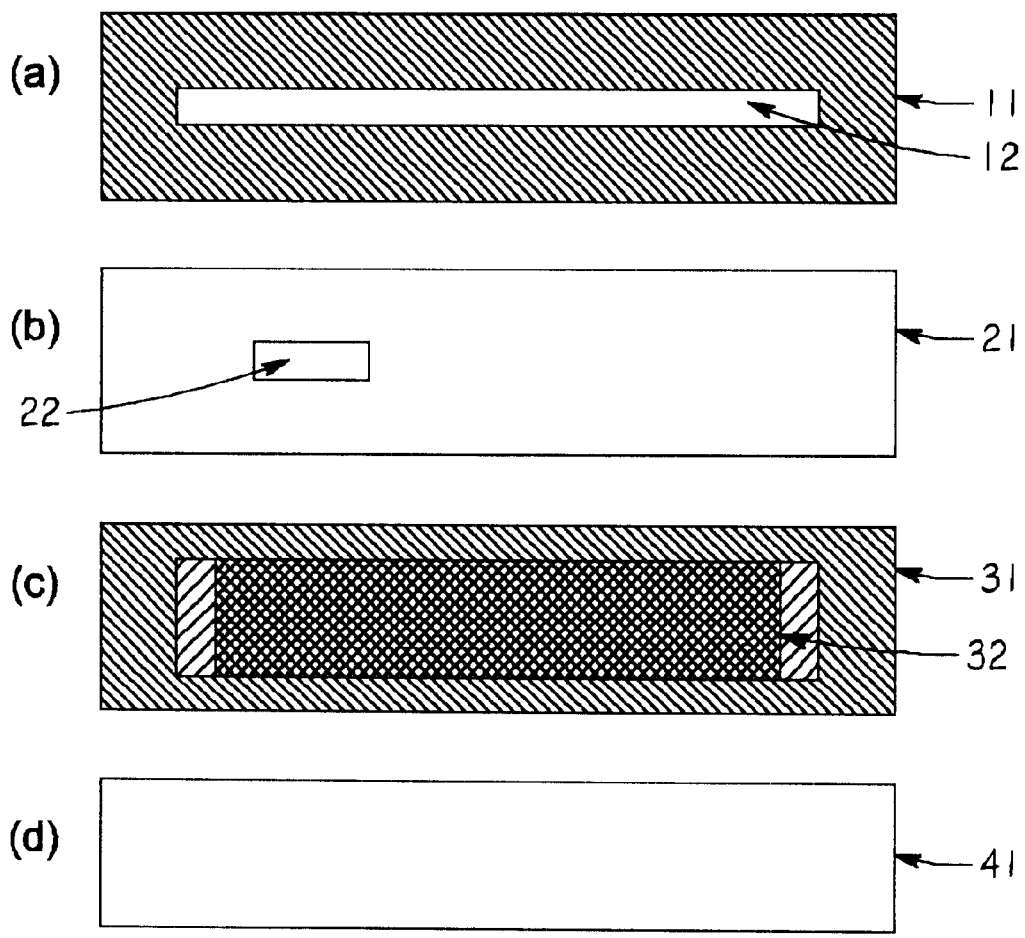
FIGS. 2(a)–(d) are plan views of each sheet of the breather filter of FIG. 1.

FIG. 1 is a sectional view showing a first embodiment of a breather filter for an HDD, according to the present invention. FIGS. 2(a)–(d) are plan views showing four sheets that configure the breather filter shown in FIG. 1, respectively. The breather filter 1 shown in FIGS. 1 and 2 is mounted at a position corresponding to a hole 3 in the cover 2 of an HDD. The breather filter 1 in this embodiment is configured by stacking a first sheet 11 formed with a diffusing tube 12 at a position corresponding to the hole 3 provided in the cover 2 of the HDD, a second sheet 21 formed with an opening 22 at a position corresponding to the diffusing tube 12 of the first sheet 11, a third sheet 31 with an adsorbent layer 32 at a position corresponding to the opening 22 of the second sheet 21, and a fourth sheet 41 comprising a filter layer covering the adsorbent layer 32 of the third sheet 31.

In this embodiment, the first sheet 11 is configured by adhesive double-coated tape. The first sheet 11 determines the configuration of the diffusing tube 12, in addition to fixation of the breather filter 1 to the cover 2 of the HDD and ensuring airtightness. To meet conflicting requirements such as a proper amount of pressure loss for breathing and an inflow restriction on the outside air, the characteristics of the diffusing tube 12 must be controlled. However, in this case the characteristics of the diffusing tube 12 can easily be controlled by the thickness of the adhesive double-coated tape configuring the first sheet 11 and the width of the diffusing tube 12. The second sheet 21 is configured by an airtight film. The second sheet 21 forms the diffusing tube 12 along with the cover 2. In other words, for the diffusing tube 12, the four sides in the depth direction of the breather filter 1 is formed with the adhesive double-coated tape, the top surface is formed with the cover 2, and the bottom surface is formed with the second sheet 21. The opening 22 in the second sheet 21 is used for guiding the outside air passed through the diffusing tube 12 to the underlying third sheet 31.

The third sheet 31 is configured by an adsorbent layer 32 and adhesive double-coated tape surrounding the layer 32. As the adsorbent layer 32, a mixture of a carbonate and silica gel is employed with active carbon as a main component. The adsorbent layer 32 can adsorb organic gas and acid gas and can also adsorb vapor. The fourth sheet 41 is configured by a particle filter. The fourth sheet 41 is used to prevent particle contamination and fixed by the adhesive double-coated tape configuring the third sheet 31. From the foregoing description it follows that the basic functions of the breather filter 1 are configured by sheets of four thin simple layers.

Furthermore, in the breather filter 1 with the structure shown in FIGS. 1 and 2, the adsorbent layer 32 is exposed to the interior of the HDD through only the fourth sheet 41 configured by the particle filter, so it can adsorb the out gas produced in the interior of the HDD. At the same time, the adsorbent layer 32 can also absorb the vapor entering the interior of the HDD and reduce a rise in the relative humidity of the HDD interior. Of course, these functions can be obtained without providing an additional filter. Since the aforementioned breather filter 1 of the present invention is thin, it can be practically increased in area without difficulty and it is also easy to further enhance the aforementioned adsorbing property.

Note that in the breather filter 1 with the structure shown in FIGS. 1 and 2, the entire opening 22 in the second sheet 21 is covered with the adsorbent layer 32 of the third sheet 31. That is, air is passed through the adsorbent layer 32 and purified. For this reason, it is preferable that the breather filter 1 in this embodiment be used when air is easily passed through the adsorbent layer 32. Also, it is generally preferable that, as the adsorbent layer 32, fibrous active carbon be employed in the form of cloth.

Figure 3:
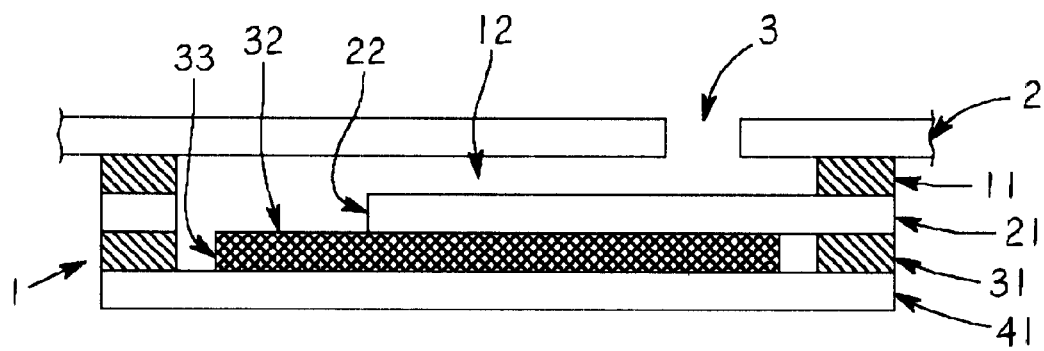
FIG. 3 is a sectional side view of a second embodiment of the breather filter of FIG. 1.
Figure 4:
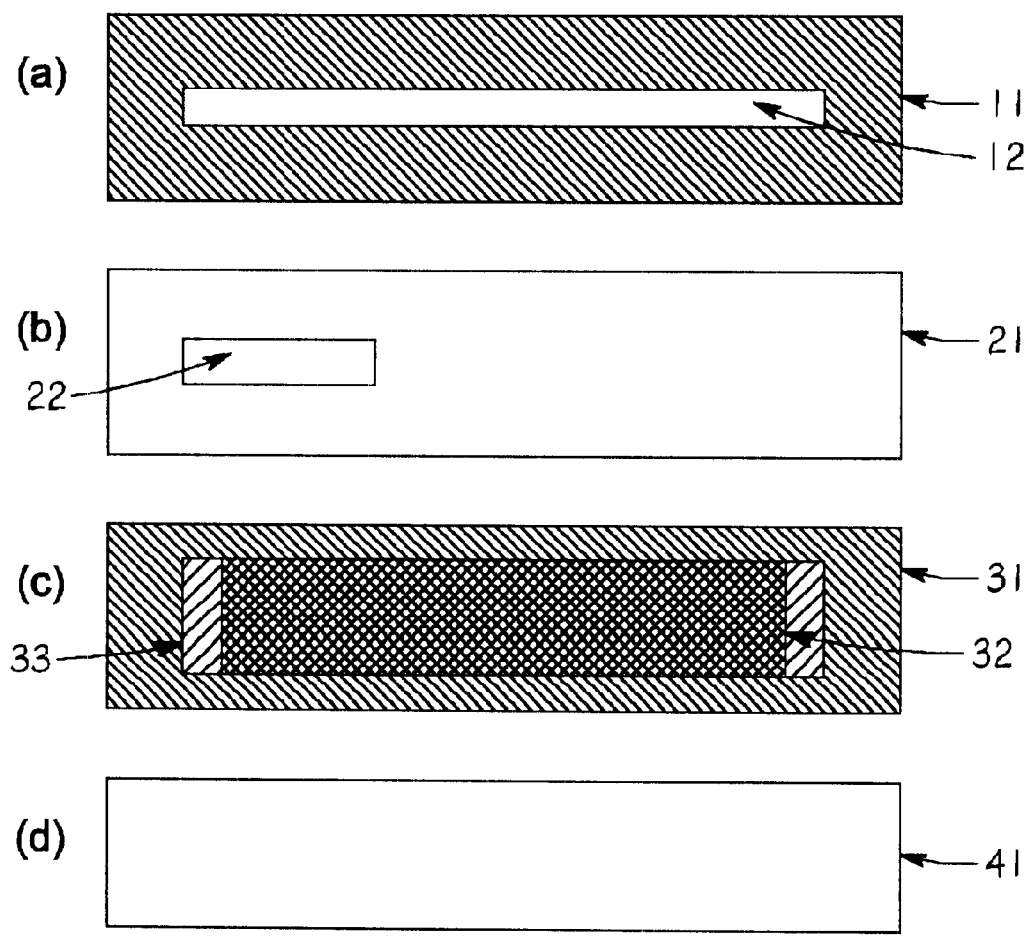
FIGS. 4(a)–(d) are plan views of each sheet of the breather filter of FIG. 3.
Figure 5:
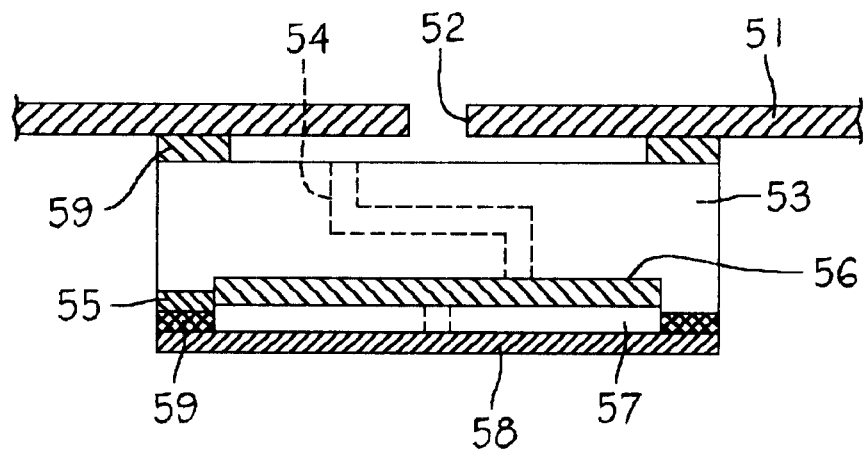
FIG. 5 is a sectional side view of a first type of prior art breather filter for an HDD.
Figure 6:
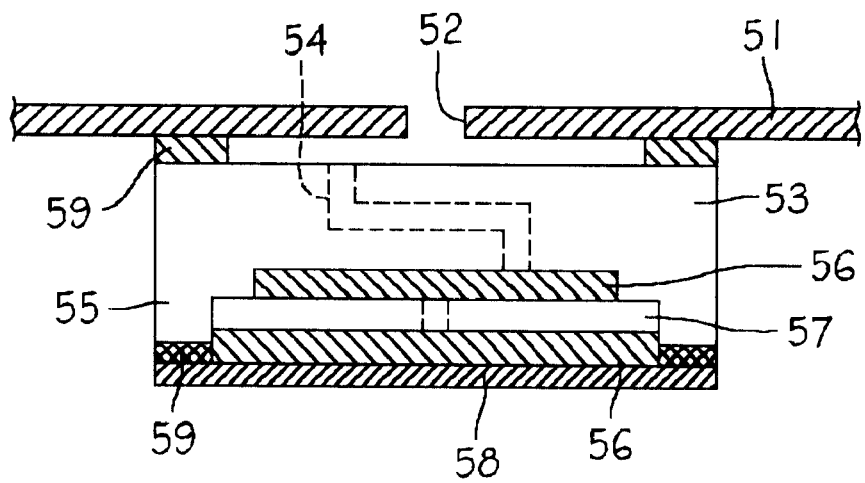
FIG. 6 is a sectional side view of a second type of prior art breather filter for an HDD.

FIG. 3 is a sectional view showing a second embodiment of the breather filter for an HDD, according to the present invention. FIGS. 4(a)–(d) are plan views showing the four sheets that configure the breather filter shown in FIG. 3, respectively. In the embodiment shown in FIGS. 3 and 4, the same reference numerals will be applied to the same members as those shown in FIGS. 1 and 2 for the sake of efficiency. In the breather filter with the configuration shown in FIGS. 3 and 4, the point differing from the breather filter 1 with the configuration shown in FIGS. 1 and 2 is that, by providing an adsorbent opening 33, a portion of the opening 22 in the second sheet 21 is covered with the adsorbent layer 32 of the third sheet 31. That is, air is passed through the surface of the adsorbent layer 32 and purified. For this reason, it is preferable that the breather filter 1 in this embodiment be used when air is not easily passed through the adsorbent layer 32. Normally, if the adsorbent layer 32 with the weight of active carbon increased by compressing active carbon onto the sheet is used, a rise in the humidity of the interior of the HDD can be suppressed more effectively. However, in that case, air is not easily passed through. Therefore, it is preferable that air be purified by surface diffusion, as in this embodiment.

Actually, in the configuration shown in FIGS. 1 and 2, the breather filter 1 of the present invention was made by stacking the first sheet 11, the second sheet 21, the third sheet 31, and the fourth sheet 41 shown below. Here, as the first sheet 11, an acrylic adhesive double-coated tape of 150 mm in thickness having a 1.5% 20 mm slit for forming the diffusing tube 12 was employed. As the second sheet 21, the 3% 2-mm opening 22 employed a PET film of 150 mm in thickness. As the third sheet 31, an active carbon fiber of 150 mm in thickness, combined with acrylic adhesive double-coated tape of 150 mm in thickness binding potassium carbonate in the form of 22% 4 mm, was employed. As the fourth sheet 41, a PTFE membrane filter of 70 mm in thickness was employed. With this, the breather filter 1 thinned to a thickness of 520 mm is obtainable and the obtained breather filter 1 can be mounted interiorly of the HDD. In addition, as the characteristics of a 1-inch-type HDD employing this breather filter 1, conflicting characteristics, i.e., a pressure loss of 9 mmH$_2$O (3 ml/min) and a relative humidity time constant of 250 hours are compatible.

The present invention has several advantages. The breather filter is configured by stacking the first sheet through the fourth sheets respectively comprising thin sheets. This configuration can attain a thin breather filter that can be mounted on a thin-type HDD such as a 1-inch-type HDD. The breather filter of the present invention can also attain the same functions as the conventional breather filter, such as purification of the outside air, an inflow restriction on the outside air, a reduction in a humidity change, and a high efficient absorption of organic out gas in the HDD interior, because the diffusing tube and the adsorbent layer are formed in each sheet. The breather filter of the present invention attains these higher functions at higher efficiency than prior art designs.

While the invention has been shown or described in only some of its forms, it should be apparent to those skilled in the art that it is not so limited, but is susceptible to various changes without departing from the scope of the invention.

What is claimed is:

1. A breather filter that is employed in a hard disk drive by attaching the breather filter to a hole provided in a cover of said hard disk drive, the breather filter comprising:
   a first sheet forming a diffusing tube at a position corresponding to said hole in the cover of the hard disk drive;
   a second sheet forming an opening at a position corresponding to said diffusing tube of said first sheet;
   a third sheet having an aperture and an adsorbent layer mounted in the aperture at a position corresponding to said opening in said second sheet, wherein said adsorbent layer has a length that is shorter than a length of the aperture, such that at least one end of the adsorbent layer is spaced apart from and free of contact with an end of the aperture;
   a fourth sheet including a filter layer with which said adsorbent layer of said third sheet is covered; and wherein
   said first sheet, said second sheet, said third sheet and said fourth sheet are stacked.

2. The breather filter as set forth in claim 1 wherein said adsorbent layer provided in said third sheet is configured so that the adsorbent layer covers the entire opening formed in said second sheet.

3. The breather filter as set forth in claim 1 wherein said adsorbent layer provided in sad third sheet is configured so that the adsorbent layer covers only a portion of said opening formed in said second sheet, such that said diffusing tube and another portion of said opening is exposed directly to the fourth sheet.

4. The breather filter as set forth in claim 1 wherein said adsorbent layer provided in said third sheet is configured by an active carbon fiber containing a carbonate.

5. A breather filter that is employed in a hard disk drive by attaching the breather filter to a hole provided in a cover of said hard disk drive, the breather filter comprising:
   a first sheet forming a diffusing tube at a position corresponding to said hole in the cover of the hard disk drive;
   a second sheet forming an opening at a position corresponding to said diffusing tube of said first sheet;
   a third sheet having an aperture and an adsorbent layer mounted in the aperture at a position corresponding to said opening in said second sheet, wherein said adsorbent layer has a length that is shorter than a length of the aperture, and at least one end of the adsorbent layer is spaced apart from and free of contact with an end of the aperture;
   a fourth sheet including a filter layer with which said adsorbent layer of said third sheet is covered; and wherein
   a portion of said opening in the second sheet is exposed directly to the fourth sheet.

6. The breather filter as set forth in claim 5 wherein said adsorbent layer provided in said third sheet is configured by an active carbon fiber containing a carbonate.

7. A breather filter that is employed in a hard disk drive by attaching the breather filter to a hole provided in a cover of said hard disk drive, the breather filter comprising:
   a first sheet forming a diffusing tube at a position corresponding to said hole in the cover of the hard disk drive;
   a second sheet forming an opening at a position corresponding to said diffusing tube of said first sheet, wherein said opening has a length that is less than a length of said diffusing tube in said first sheet;
   a third sheet having an aperture arid an adsorbent layer mounted in the aperture, wherein the adsorbent layer has a length that is less than a length of the aperture, and the length of the aperture is greater than the length of the opening, wherein the adsorbent layer is located at a position corresponding to said opening in said second sheet, wherein said adsorbent layer is configured to cover only a portion of said opening formed in said second sheet, and wherein the adsorbent layer has two ends that are both spaced apart from ends of the aperture in a direction corresponding to the lengths of the adsorbent layer and the aperture;
   a fourth sheet including a filter layer with which said adsorbent layer of said third sheet is covered; wherein
   a portion of said opening is exposed directly to the fourth sheet; and wherein
      is said adsorbent layer provided in said third sheet is configured by an active carbon fiber containing a carbonate.

* * * * *

UNITED STATES PATENT AND TRADEMARK OFFICE
CERTIFICATE OF CORRECTION

PATENT NO. : 6,683,746 B1
DATED : January 27, 2004
INVENTOR(S) : Kuroki et al.

It is certified that error appears in the above-identified patent and that said Letters Patent is hereby corrected as shown below:

Column 5,
Line 39, "sad" should read -- said --.

Column 6,
Line 31, "arid", should read -- and --.
Line 48, "is", should be deleted (the first occurrence).

Signed and Sealed this

Fourth Day of May, 2004

JON W. DUDAS
*Acting Director of the United States Patent and Trademark Office*